Patented Jan. 22, 1935

1,988,455

UNITED STATES PATENT OFFICE 1,988,455

PREPARATION OF GLYOXAL

Samuel Lenher, Wilmington, Del., assignor to E. I. du Pont de Nemours & Company, Wilmington, Del., a corporation of Delaware No Drawing. Application July 24, 1930, Serial No. 470,537

11 Claims. (Cl. 260—139)

This invention relates to the oxidation of acetylene, and particularly for the preparation of glyoxal.

It is an object of this invention to oxidize acetylene. Another object is to prepare glyoxal. Another object is to prevent the reaction which results in the formation of the glyoxal from proceeding to secondary reactions in which less useful materials are produced. Other objects will be in part apparent and in part set forth below.

The second of these objects is attained by reacting acetylene with oxygen at elevated temperatures in the presence of a catalyst consisting of small amounts of nitric acid vapor, or of a nitrogen oxide gas. This object is more efficiently accomplished by carrying out the reaction in the presence of water vapor. The method of accomplishing these and the other objects is set forth below with particular reference to the production of glyoxal.

In the practice of my invention the reaction gases are mixed (either before the reaction or in the reaction chamber) in approximately equimolecular proportions, with enough of the catalyst to secure a satisfactory yield. The proportions of acetylene to oxygen should be about equimolecular, but it is advisable to have a small excess of acetylene present because an increase in the concentration of acetylene increases the rate at which the reaction proceeds. An excess of oxygen has little effect on the reaction. The mixed gases are flowed through a heated reaction tube at a rate such that the gases will be heated for a time sufficient to efficiently complete the reaction. This time may be from a few seconds to several hundred seconds, but a hundred seconds is usually sufficient.

The process is carried out at temperatures between about 170° C. and the temperature at which the particular mixture will explode. This temperature is often between 250° and 300° C.

I have discovered that the reaction proceeds more quickly and with improved yield when it is carried out in the presence of catalysts such as the oxides of nitrogen. Any oxide of nitrogen is to a greater or less extent a catalyst for this reaction, but I prefer to use either nitric acid vapor or nitrogen dioxide because they can easily be recovered in practically quantative amounts.

The concentration of nitrogen oxide gas is an important variable in the reaction as the amount of acetylene oxidized increases sharply with the increasing concentration of nitrogen oxide gas. Thus, for example, in an experiment in which an equimolecular mixture of oxygen and acetylene containing 1% of nitric acid vapor was heated at 210° C. for a period of 200 seconds only 2% of the acetylene was oxidized, and of this 2% only 1% formed glyoxal. Under the same conditions, but in the presence of 1.7% nitric acid vapor, 10% of the acetylene was oxidized and 5% of that amount went to glyoxal. With 4% nitric acid vapor 30% of the acetylene was oxidized and 15% of the oxidized portion formed glyoxal.

I have discovered that the percentage of acetylene which is converted to glyoxal is considerably increased if the process is carried out in the presence of water vapor, and that the presence of water vapor reduces the amount of carbon monoxide which is formed in the reaction. The amount of carbon dioxide formed appears to be independent of the water vapor concentration. In conducting the reaction I prefer to use 4% to 5% water vapor.

Water vapor does not appear to increase the amount of acetylene oxidized, but it does increase the actual conversion to glyoxal by preventing the oxidation of acetylene beyond the primary stage of glyoxal, $(C_2H_2+O_2 \rightarrow C_2H_2O_2)$ or by inhibiting the thermal decomposition of glyoxal to carbon monoxide and hydrogen, $$(C_2H_2O_2 \rightarrow 2CO+H_2).$$

This action of water to favor glyoxal formation is probably due to its polymerizing action on glyoxal, because water converts monomeric glyoxal rapidly to the more highly polymerized and thermally more stable trimeric compound. The glyoxal obtained in these experiments was mainly in the solid, or resinous, polymeric form.

The following table illustrates the effect of water vapor on the reaction. The data in this table is illustrative, not limitative.

*Table of percentage of products in acetylene oxidation*

| No. | Per cent $H_2O$ in $C_2H_2$-$O_2$ mixture | t° C. | Per cent $CO_2$ | Per cent CO | Per cent $H_2$ | Per cent formaldehyde, formic acid, and monomeric glyoxal | Per cent glyoxal (trimeric form) | Total percentage $C_2H_2$ oxidized | Per cent of oxidized portion converted to glyoxal |
|---|---|---|---|---|---|---|---|---|---|
| 1 | 0.0 | 210 | 1.4 | 10.0 | 0.8 | 1.5 | 15.5 | 29.3 | 52.9 |
| 2 | 0.0 | 210 | 1.8 | 9.0 | 1.1 | 2.5 | 12.9 | 27.3 | 47.2 |
| 3 | 4.0 | 210 | 1.8 | 5.9 | 0.5 | 2.0 | 12.5 | 22.7 | 55.0 |
| 4 | 4.0 | 210 | 1.8 | 7.2 | 1.0 | 2.0 | 13.6 | 25.6 | 57.0 |
| 5 | 0.0 | 230 | 2.5 | 11.0 | 1.5 | 2.2 | 12.6 | 29.8 | 42.2 |
| 6 | 0.0 | 230 | 2.8 | 11.1 | 0.8 | 3.1 | 17.9 | 35.7 | 50.0 |
| 7 | 4.0 | 230 | 2.2 | 7.9 | 0.6 | 2.5 | 20.8 | 34.0 | 61.0 |
| 8 | 4.0 | 230 | 2.3 | 10.3 | 1.2 | 2.5 | 23.0 | 39.3 | 58.5 |

In these examples equimolecular mixtures of acetylene and oxygen were subjected to the indicated heating for 180 seconds in the presence of 4.0% of $HNO_3$ in the mixture. The effect of water vapor in increasing the conversion of acetylene to glyoxal and in reducing the amount of carbon monoxide formed is shown by comparing 3 and 4 in the above table with 1 and 2, and by comparing 7 and 8 with 5 and 6.

The amount of acetylene oxidized is affected by the temperature, the duration of the heating period, the concentration of acetylene, air or oxygen, and of nitrogen oxide gas, and on the shape and material of the reaction vessel. As the temperature is raised above 170° the amount of acetylene oxidized increases. This increase is not rapid until a temperature is reached which is very near (within about 10°) the explosion temperature, which under the conditions investigated was above 250°. An increase in the time of contact increases the amount of oxidation. However, all the products of oxidation are not increased proportionally. Prolonged heating increases the amount of gaseous products, and decrease in the time of contact favors the formation of glyoxal and formaldehyde.

The reaction tube which is used in the continuous flow process or the reaction vessel which is used in the batch process may be of any suitable substance such as glass, porcelain, metals such as steel, or any of these substances re-inforced, or lined, with other suitable substances.

The oxidation is known to take place in the gas phase and proceeds slowly without explosion or inflammation. The process was operated, in the examples cited above, at atmospheric pressure or at pressures differing only slightly from one atmosphere. It is to be understood, however, that greater or less pressures can be used with proper manipulation of the other factors.

The glyoxal is removed from the gases on leaving the reaction tube by absorption in water or other suitable solvent (such as alcohol), or by condensation in a cooling system, or by chemical reaction with an active substance such as sodium bisulfite. After removal of the glyoxal the gases can be enriched with acetylene, with oxygen or air, or with additional quantities of catalyst if necessary, and again passed through the reaction tube.

The process can be carried out by either the continuous flow method above described or by a batch process.

The chemical reactions in this process are believed to be expressed by the following equations although it is to be understood that these equations are matters of theory and are not to be construed as limiting the invention.

(1) 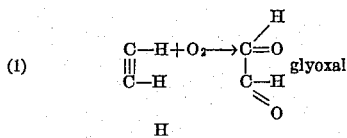

(2) 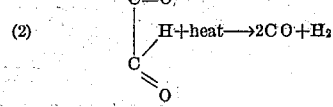

(3) 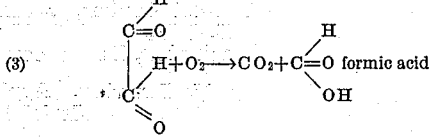

(4) 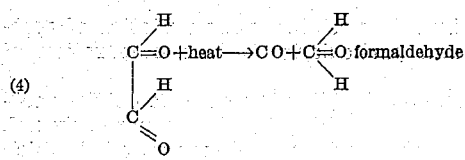

(5) 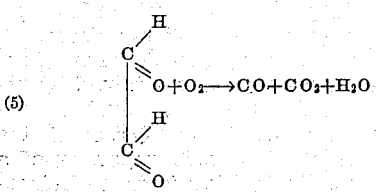

Glyoxal occurs in the oxidation products in several of its many forms. It occurs in the monomeric, trimeric, and more highly polymerized forms. Monomeric glyoxal, $C_2H_2O_2$, is a liquid at room temperature (M. P. 15°) and can be recovered by cooling or by absorption. Trimeric glyoxal, $(C_2H_2O_2)_3$, and polymeric-glyoxal, $(C_2H_2O_2)_n$, condense as solids which are soluble in water and in alcohol.

My invention finds utility in the production of glyoxal, in the production of formaldehyde, and in the production of formic acid from acetylene in one operation. This is particularly valuable in view of the fact that there does not appear at present to be any other commercial method for the manufacture of glyoxal. Glyoxal is potentially a compound of great value as a raw material from which to derive other products. A few of its many uses are listed below.

(1) The manufacture of ethylene glycol. Glyoxal from this process is reduced by hydrogen in the presence of a catalyst to form ethylene glycol.

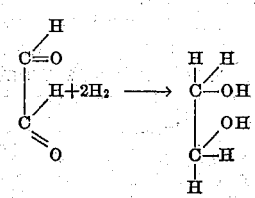

(2) The manufacture of tartaric acid and tartrates. Glyoxal from this process is reacted with hydrocyanic acid to form glyoxaldicyanhydrin:

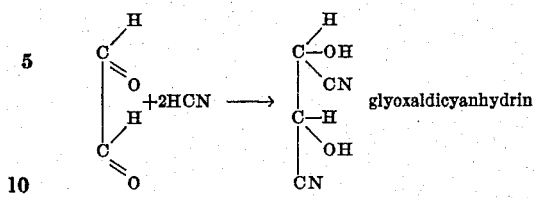

The glyoxaldicyanhydrin is hydrolyzed by acid, alkali, or superheated steam to mesotartaric acid.

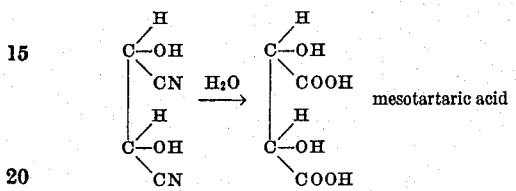

(3) The synthesis of indigo. Glyoxal is reacted with sodium bisulfite, and the glyoxal sodium bisulfite addition compound formed on reaction with aniline in dilute alcoholic solution forms phenyl aminoacetic acid anilide which is a starting material for the indigo fusion.

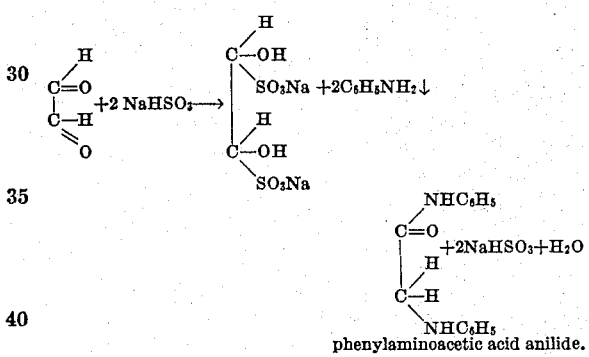

(4) The manufacture of glycollic acid and glycollates. Glyoxal is oxidized in dilute nitric acid solution to glycollic acid and its salts.

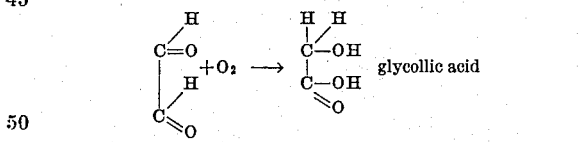

Among the advantages of this invention are the preparation of glyoxal and the development of a continuous flow method of preparing glyoxal. Other advantages will be apparent.

As many apparently widely different embodiments of this invention may be made without departing from the spirit and scope thereof, it is to be understood that I do not limit myself to the specific embodiments thereof except as defined in the appended claims.

I claim:

1. The method of reacting acetylene and oxygen comprising heating the mixed gases above 170° C. and below the explosion temperature in the presence of a catalyst selected from the class consisting of nitric acid and nitric oxide.

2. The method of reacting acetlyene and oxygen comprising passing the mixed gases above 170° C. and below the temperature of explosion through a heated reaction tube in the presence of a catalyst selected from the class consisting of nitric acid and nitric oxide.

3. The method of preparing glyoxal comprising passing acetylene and oxygen through a reaction tube heated above 170° C. and below the explosion temperature in the presence of a catalyst selected from the class consisting of nitric acid and nitric oxide.

4. The method of preparing glyoxal comprising passing acetylene and oxygen through a reaction tube heated above 170° C. and below the explosion temperature in the presence of a catalyst and a polymerizing agent for glyoxal, said catalyst being selected from the class consisting of nitric acid and nitric oxide.

5. The method of preparing glyoxal comprising heating above 170° C. and below the explosion temperature a gaseous mixture containing acetylene and oxygen in the presence of water and a catalyst selected from the class consisting of nitric acid, and nitric oxide.

6. The method of preparing glyoxal comprising passing a gaseous mixture containing acetylene and oxygen through a reaction tube heated above 170° C. and below the explosion temperature in the presence of water vapor and a catalyst selected from the class consisting of nitric acid and nitric oxide.

7. The method of preparing glyoxal comprising passing acetylene in slight excess and oxygen through a reaction tube heated betwen about 170° C. and about 300° C. in the presence of water vapor and a catalyst selected from the class consisting of nitric acid and nitric oxide.

8. The method of preparing glyoxal comprising passing acetylene in slight excess and oxygen through a reaction tube heated to a temperature between about 170° and about 300° C. in the presence of about 4% to 5% of a catalyst selected from the class consisting of nitric acid and nitric oxide and 4% to 5% water vapor.

9. The method of preparing glyoxal comprising passing acetylene in excess and oxygen through a reaction tube heated between about 170° and 300° C. in the presence of about 4% to 5% of a catalyst selected from the class consisting of nitric acid and nitric oxide and 4% to 5% water vapor at a rate such that the reacting gas will be heated for approximately 100 seconds.

10. The method of reacting oxygen and acetylene consisting in passing approximately equimolecular proportions of oxygen and acetylene through a conduit heated to a temperature above 170° C. but below the explosion temperature of the mixture at a low velocity in the presence of a catalyst selected from the class consisting of nitric acid and nitric oxide.

11. The method of reacting above 170° C. and below the explosion temperature acetylene and oxygen in the presence of a catalyst with the production of glyoxal, carbon monoxide, carbon dioxide, hydrogen, formic acid, formaldehyde, and water, said catalyst being selected from the class consisting of nitric acid and nitric oxide.

SAMUEL LENHER.